US011820403B2

(12) United States Patent
Sindhuja et al.

(10) Patent No.: US 11,820,403 B2
(45) Date of Patent: Nov. 21, 2023

(54) METHOD AND SYSTEM OF DETERMINING TRAJECTORY FOR AN AUTONOMOUS VEHICLE

(71) Applicant: Wipro Limited, Bangalore (IN)

(72) Inventors: A. Sindhuja, Uttar Pradesh (IN); Amrit Paul, Hyderabad (IN)

(73) Assignee: Wipro Limited, Bangalore (IN)

( * ) Notice: Subject to any disclaimer, the term of this patent is extended or adjusted under 35 U.S.C. 154(b) by 333 days.

(21) Appl. No.: 16/933,140

(22) Filed: Jul. 20, 2020

(65) Prior Publication Data

US 2021/0300440 A1 Sep. 30, 2021

(30) Foreign Application Priority Data

Mar. 30, 2020 (IN) .............................. 202041013921

(51) Int. Cl.
*B60W 60/00* (2020.01)
*G06V 20/54* (2022.01)
*G06V 20/58* (2022.01)

(52) U.S. Cl.
CPC ....... *B60W 60/00276* (2020.02); *G06V 20/54* (2022.01); *G06V 20/58* (2022.01); *B60W 2556/50* (2020.02); *B60W 2556/65* (2020.02)

(58) Field of Classification Search
CPC .......................... B60W 60/00276; G06V 20/58
See application file for complete search history.

(56) References Cited

U.S. PATENT DOCUMENTS

| 9,734,455 B2 | 8/2017 | Levinson et al. |
| 2007/0152804 A1* | 7/2007 | Breed ..................... G01S 19/17 701/301 |
| 2014/0143834 A1 | 5/2014 | Stahlin et al. |
| 2016/0091328 A1* | 3/2016 | Ould-Ahmen-Vall ...................... G01C 21/3691 701/117 |
| 2016/0195405 A1* | 7/2016 | Kreifeldt ............ G01C 21/3484 701/533 |

(Continued)

FOREIGN PATENT DOCUMENTS

CN 110446278 A 11/2019
DE 102018126664 A1 5/2019

*Primary Examiner* — Jess Whittington
(74) *Attorney, Agent, or Firm* — Finnegan, Henderson, Farabow, Garrett & Dunner, LLP

(57) ABSTRACT

A method of determining a navigation trajectory for an autonomous ground vehicle (AGV) is disclosed. The method may include receiving first Region of Interest (ROI) data associated with an upcoming trajectory path, and receiving predicted attributes associated with a future navigation trajectory for the upcoming trajectory path. The predicted attributes are derived based on map for the upcoming trajectory path. The method may further include modifying the predicted attributes based on environmental attributes extracted from first ROI data to generate modified attributes, and dynamically receiving a second ROI data associated with the upcoming trajectory path upon reaching the upcoming trajectory path. The method may further include predicting dynamic attributes associated with an imminent navigation trajectory for the upcoming trajectory path based on the second ROI data, and refining the modified attributes based on the one or more dynamic attributes to generate a final navigation trajectory.

12 Claims, 6 Drawing Sheets

(56) References Cited

U.S. PATENT DOCUMENTS

| | | |
|---|---|---|
| 2017/0316333 A1 | 11/2017 | Levinson et al. |
| 2017/0337810 A1* | 11/2017 | Abe .................. G01C 21/3492 |
| 2018/0336787 A1* | 11/2018 | Ohnishi ................. G06V 20/56 |
| 2019/0087668 A1* | 3/2019 | Kim ....................... G06V 20/58 |
| 2019/0130220 A1 | 5/2019 | Zou et al. |
| 2019/0139403 A1 | 5/2019 | Alam et al. |
| 2019/0340522 A1* | 11/2019 | Mori ................. B60W 30/0956 |
| 2019/0347498 A1 | 11/2019 | Herman et al. |
| 2020/0372792 A1* | 11/2020 | Li ........................ G06V 10/764 |

\* cited by examiner

METHOD AND SYSTEM OF DETERMINING TRAJECTORY FOR AN AUTONOMOUS VEHICLE

TECHNICAL FIELD

This disclosure relates generally to an autonomous ground vehicle (AGV) and more particularly to a method and a system of determining a navigation trajectory for an autonomous ground vehicle (AGV).

BACKGROUND

Autonomous ground vehicles (AGVs) are increasingly deployed in a variety of indoor and outdoor settings so as to facilitate efficient transportation. An AGV may be capable of sensing the dynamic changing environment, and of accurately navigating without any human intervention. For example, the AGV may be configured to determine a global path from origin to destination for navigation, and then a finer trajectory plan for a local visible region during navigation.

An AGV may make use of different sensors like LIDAR, camera, GPS, IMU, etc. for capturing data to perceive and understand the environment in which it is present. The captured data may be fed to different algorithms to perform the required actions, such as object detection, semantic segmentation etc. These algorithms are to be trained which may require high computational needs. Further, the algorithms are to be inferenced during runtime of the AGV. It may be noted that a significant inferencing time may be consumed by these algorithms, per frame of data captured. This causes delay and creates synchronization issues with the autonomous navigation of the AGV, thereby necessitating a need of high computational platform on the go.

Some available techniques provide for automatic classification for the objects detected in an environment, and for enhancing mapping for the AGVs. However, these techniques require high computational capacity which may not be available on-board the AGV, due to which synchronization between hardware and software modules is impacted.

SUMMARY

In one embodiment, a method of determining a navigation trajectory for an autonomous ground vehicle (AGV) is disclosed. The method may include receiving first Region of Interest (ROI) data associated with an upcoming trajectory path. The first ROI data may be captured while approaching the upcoming trajectory path from an anticipated future location of the AGV. The method may further include receiving one or more predicted attributes associated with a future navigation trajectory for the upcoming trajectory path. The one or more predicted attributes may be predicted based on map data associated with the upcoming trajectory path using a first artificial intelligence (AI) prediction model. The method may further include modifying the one or more predicted attributes based on the one or more environmental attributes associated with the upcoming trajectory path to generate one or more modified attributes associated with the future navigation trajectory. The one or more environmental attributes may be derived based on the first ROI data. The method may further include dynamically receiving a second ROI data associated with the upcoming trajectory path upon reaching the anticipated future location. The method may further include predicting one or more dynamic attributes associated with an imminent navigation trajectory for the upcoming trajectory path based on the second ROI data using a second AI prediction model, and refining the one or more modified attributes based on the one or more dynamic attributes to generate a final navigation trajectory.

In another embodiment, a navigation device for determining a navigation trajectory for an AGV is disclosed. The navigation device includes a processor and a memory communicatively coupled to the processor. The memory stores processor instructions, which, on execution, may cause the processor to receive first ROI data associated with an upcoming trajectory path. The first ROI data may be captured while approaching the upcoming trajectory path from an anticipated future location of the AGV. The processor instructions, on execution, may further cause the processor to receive one or more predicted attributes associated with a future navigation trajectory for the upcoming trajectory path. The one or more predicted attributes may be predicted based on map data associated with the upcoming trajectory path using a first AI prediction model. The processor instructions, on execution, may further cause the processor to modify the one or more predicted attributes based on the one or more environmental attributes associated with the upcoming trajectory path to generate one or more modified attributes associated with the future navigation trajectory. The one or more environmental attributes may be derived based on the first ROI data. The processor instructions, on execution, may further cause the processor to dynamically receive a second ROI data associated with the upcoming trajectory path upon reaching the anticipated future location, predict one or more dynamic attributes associated with an imminent navigation trajectory for the upcoming trajectory path based on the second ROI data using a second AI prediction model, and refine the one or more modified attributes based on the one or more dynamic attributes to generate a final navigation trajectory.

In yet another embodiment, a non-transitory computer-readable storage medium is disclosed. The non-transitory computer-readable storage medium has stored thereon, a set of computer-executable instructions causing a computer comprising one or more processors to perform steps including receiving first ROI data associated with an upcoming trajectory path. The first ROI data may be captured while approaching the upcoming trajectory path from an anticipated future location of the AGV. The steps may further include receiving one or more predicted attributes associated with a future navigation trajectory for the upcoming trajectory path. The one or more predicted attributes may be predicted based on map data associated with the upcoming trajectory path using a first AI prediction model. The steps may further include modifying the one or more predicted attributes based on the one or more environmental attributes associated with the upcoming trajectory path to generate one or more modified attributes associated with the future navigation trajectory. The one or more environmental attributes may be derived based on the first ROI data. The steps may further include dynamically receiving a second ROI data associated with the upcoming trajectory path upon reaching the anticipated future location, predicting one or more dynamic attributes associated with an imminent navigation trajectory for the upcoming trajectory path based on the second ROI data using a second AI prediction model, and refining the one or more modified attributes based on the one or more dynamic attributes to generate a final navigation trajectory.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
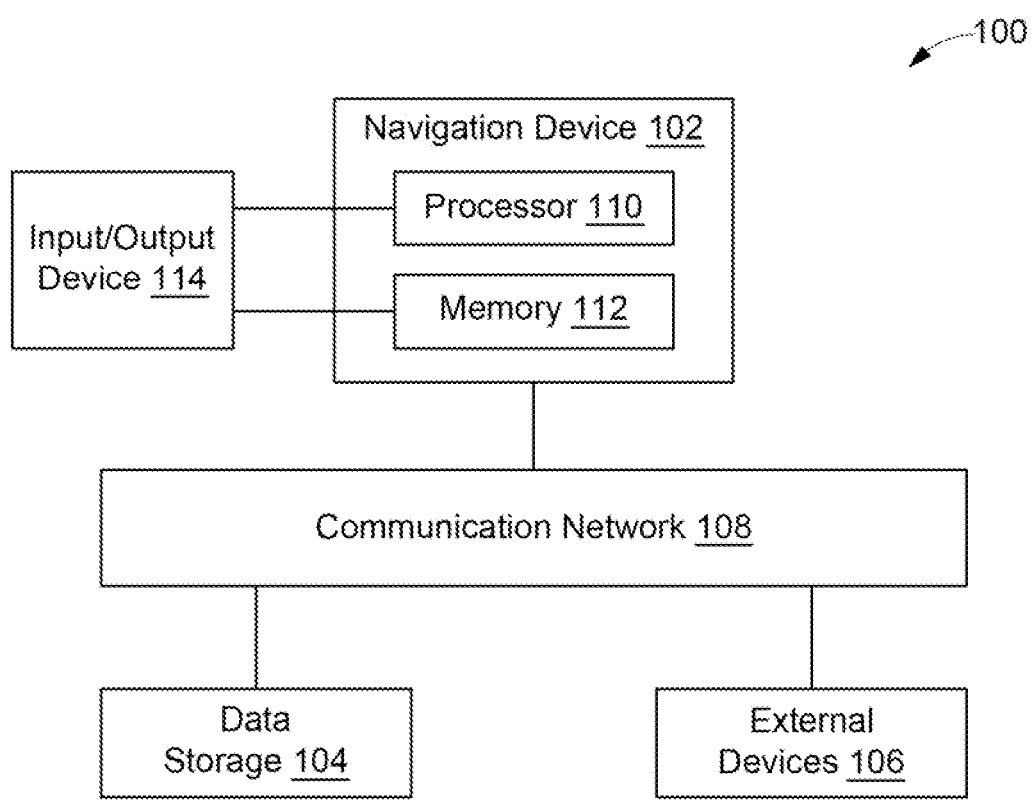
FIG. 1 is a block diagram of a system for determining a navigation trajectory for an autonomous ground vehicle (AGV), in accordance with an embodiment.

Referring now to FIG. 1, a block diagram of a system 100 for determining a navigation trajectory for an autonomous ground vehicle (AGV) is illustrated, in accordance with an embodiment of the present disclosure. The system 100 may include a navigation device 102. The navigation device 102 may be a computing device having data processing capability. In particular, the navigation device 102 may have capability for determining a navigation trajectory for an AGV. Examples of the navigation device 102 may include, but are not limited to, a server, a desktop, a laptop, a notebook, a netbook, a tablet, a smartphone, a mobile phone, an application server, a sever, or the like. The system 100 may further include a data storage 104. For example, the data storage 104 may store first Region of Interest (ROI) data, one or more predicted attributes, second ROI data associated with the upcoming trajectory path, etc. The navigation device 102 may be communicatively coupled to the data storage 104 via a communication network 108. The communication network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

As will be described in greater detail in conjunction with FIG. 2 to FIG. 5, in order to determine the navigation trajectory for an AGV, the navigation device 102 may receive a first ROI data associated with an upcoming trajectory path. The first ROI data may be captured while approaching the upcoming trajectory path from an anticipated future location of the AGV. The navigation device 102 may further receive one or more predicted attributes associated with a future navigation trajectory for the upcoming trajectory path. These one or more predicted attributes may be predicted based on map data associated with the upcoming trajectory path using a first artificial intelligence (AI) prediction model. The navigation device 102 may further modify the one or more predicted attributes based on the one or more environmental attributes associated with the upcoming trajectory path to generate one or more modified attributes associated with the future navigation trajectory. The one or more environmental attributes may be derived based on the first ROI data. The navigation device 102 may further dynamically receive a second ROI data associated with the upcoming trajectory path upon reaching the anticipated future location, and predict one or more dynamic attributes associated with an imminent navigation trajectory for the upcoming trajectory path based on the second ROI data using a second AI prediction model. The navigation device 102 may further refine the one or more modified attributes based on the one or more dynamic attributes to generate a final navigation trajectory.

In order to perform the above discussed functionalities, the navigation device 102 may include a processor 110 and a memory 112. The memory 112 may store instructions that, when executed by the processor 110, cause the processor 110 to determine a navigation trajectory for the AGV, as discussed in greater detail in FIG. 2 to FIG. 5. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but may be not limited to, Dynamic Random Access Memory (DRAM), and Static Random-Access memory (SRAM). The memory 112 may also store various data (e.g. first ROI data, predicted attributes data, first AI prediction model data, modified attributes data, environmental attributes data, second ROI data, dynamic attributes data, imminent navigation trajectory data, upcoming trajectory path data, final navigation trajectory data, etc.) that may be captured, processed, and/or required by the system 100. The navigation device 102 may further include one or more input/output devices 114 through which the navigation device 102 may interact with a user and vice versa. By way of an example, the input/output device 114 may be used to display the final navigation trajectory. The system 100 may interact with one or more external devices 106 over the communication network 108 for sending or receiving various data. Examples of the one or more external devices 106 may include, but are not limited to a remote server, a digital device, or another computing system.

Figure 2:
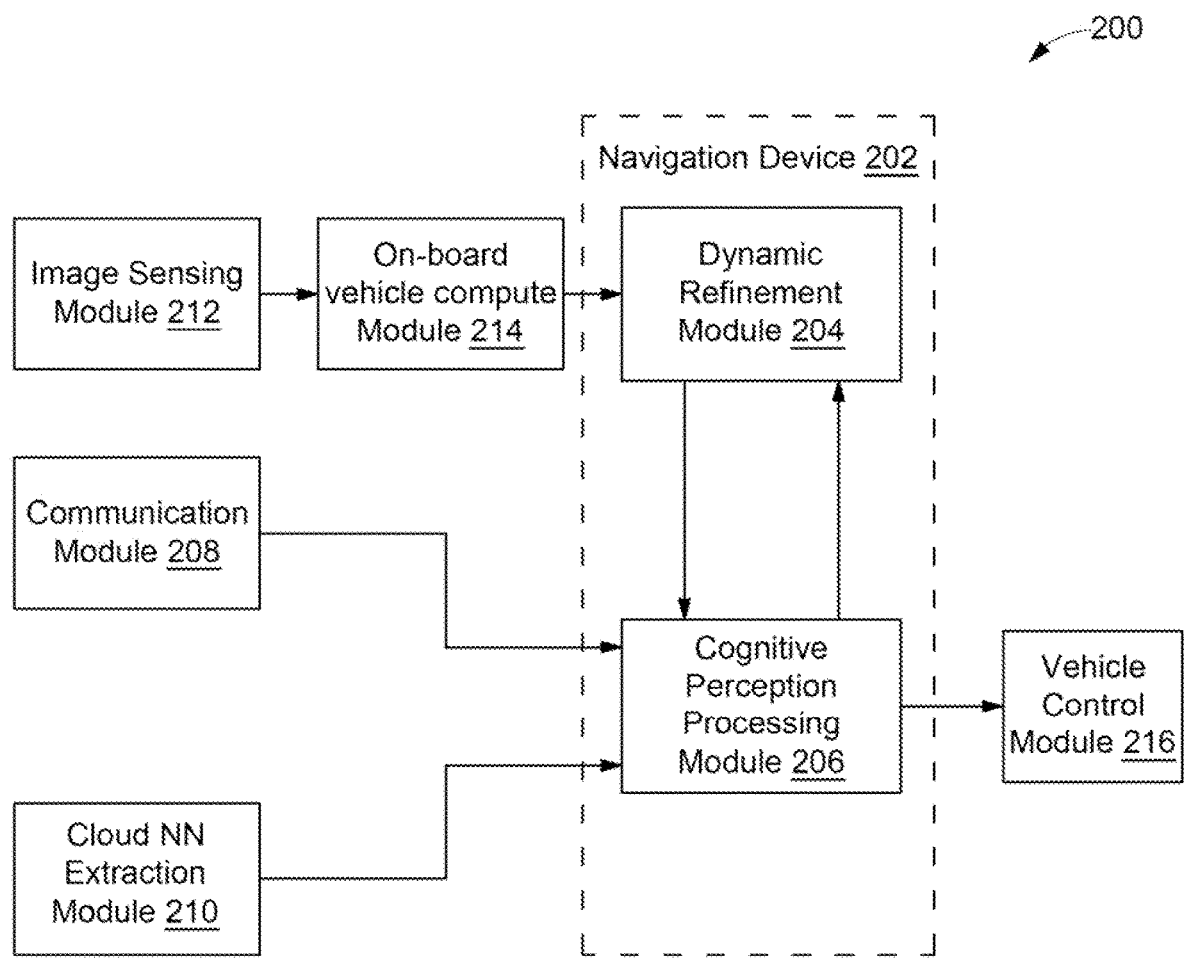
FIG. 2 is a functional block diagram of a system for determining a navigation trajectory for an AGV, in accordance with another embodiment.

Referring now to FIG. 2, a functional block diagram of a system 200 (analogous to the system 100) for determining a navigation trajectory for the AGV is illustrated, in accordance with an embodiment of the present disclosure. In some embodiments, the system 200 may include a navigation device 202 (analogous to the navigation device 102 of the system 100). The navigation device 202 may further include a dynamic refinement module 204 and a cognitive perception processing module 206. The system 200 may further include a communication module 208, a cloud neural network (NN) extraction module 210, an image sensing module 212, an on-board vehicle compute module 214, and a vehicle control module 216.

The communication module 208 may be capable of performing Vehicle-to-Infrastructure (V2I) communication and/or Vehicle-to-Vehicle (V2V) communication. As will be appreciated by those skilled in the art, a V2I communication may be a wireless exchange of data between vehicles and road infrastructure. Similarly, a V2V communication may be a wireless exchange of data between vehicles and other vehicles. As, such the AGV may communicate with the V2I infrastructure and/or V2V vehicle via the V2I communication module 208. By communicating with the V2I infrastructure and/or the V2V vehicle, the AGV may receive environmental data captured by sensors (e.g., camera, LIDAR, etc.) installed on the V2I infrastructure and/or the V2V vehicle. The environmental data may have information about obstacles present in a ROI. The information about the obstacles may include specifications of obstacles including a type of the obstacle, a location of the obstacle, etc. It may be noted that the ROI may refer to a region from which a camera sensor, present on the AGV will capture frames in the future after a specified time period, i.e. when the AGV physically reaches the ROI. This obstacle information may be received by the AGV which may further process it.

The cloud NN extraction module 210 may perform predictions on a static map of the ROI and may store the predictions on a cloud. The AGV may request the information of these predictions performed on the static map of the ROI and stored on the cloud. These predictions may be sent to the AGV, and later may be processed further. The image sensing module 212 (also referred to as image capturing module 212) may be a camera sensor placed on the AGV. The image sensing module 212 may capture frames of a current location for performing on-board computing of predictions. This computing of predictions may be performed using algorithms like semantic segmentation, object detection etc.

The on-board vehicle compute module 214 may include a plurality of neural networks which may generate predictions, including but not limited to, semantic segmentation, object detection, lane detection, on the images captured by the camera sensor (i.e. the image sensing module 212). Further, the on-board vehicle compute module 214 may send the predictions for dynamic refinement for improving predictions of the cognitive perception processing module 206 of the navigation device 202, as will be explained later.

As mentioned above, the navigation device 202 may include the dynamic refinement module 204 and the cognitive perception processing module 206. The dynamic refinement module 204 may receive input from the on-board vehicle compute module 214 and the cognitive perception processing module 206. The dynamic refinement module 204 may correct the predictions from the cognitive perception processing module 206 by calculating the error generated, by comparing it with the predictions outputted from the on-board vehicle compute module 214. The corrected predictions may be sent back again to the cognitive perception processing module 206.

The cognitive perception processing module 206 may receive inputs from the communication module 208 about the environment information at the ROI. The cognitive perception processing module 206 may further receive inputs from the cloud NN extraction module 210 about the predictions performed based on the static map of the ROI. The environment information may include type and location of obstacles. This environment information may be used to add and modify the already predicted output with respect to the ROI. As the ROI represents the futuristic frames, the predicted output may be sent to vehicle control module 216 for further processing. Further, the predictions from the cognitive perception processing module 206 may be sent to the dynamic refinement module 204 where the predictions may be corrected by comparing them with the predictions outputted from on-board vehicle compute module 214.

It may be noted that the predictions outputted from the cognitive perception processing module 206 are independent of any neural network predictions. As a result, the process of prediction consumes minimal computation power and also reduces the time taken for processing, as compared to conventional methods. As a result, the whole process is energy-efficient and time-efficient.

The vehicle control module 216 may receive predictions for futuristic scenarios which may be used to make decisions related to the AGV's autonomous navigation, such as for path planning, trajectory generation, and managing traffic which will be encountered in the future.

It should be noted that all such aforementioned modules 204-216 may be represented as a single module or a combination of different modules. Further, as will be appreciated by those skilled in the art, each of the modules 204-216 may reside, in whole or in parts, on one device or multiple devices in communication with each other. In some embodiments, each of the modules 204-216 may be implemented as dedicated hardware circuit comprising custom application-specific integrated circuit (ASIC) or gate arrays, off-the-shelf semiconductors such as logic chips, transistors, or other discrete components. Each of the modules 204-216 may also be implemented in a programmable hardware device such as a field programmable gate array (FPGA), programmable array logic, programmable logic device, and so forth. Alternatively, each of the modules 204-216 may be implemented in software for execution by various types of processors (e.g., processor 110). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for determining a navigation trajectory for an AGV. For example, the exemplary system 100 and the associated navigation device 102 may determine the navigation trajectory for the AGV by the processes discussed herein. In particular, as will be appreciated by those of ordinary skill in the art, control logic and/or automated routines for performing the techniques and steps described herein may be implemented by the system 100 and the associated navigation device 102 either by hardware, software, or combinations of hardware and software. For example, suitable code may be accessed and executed by the one or more processors on the system 100 and the associated navigation device 102 to perform some or all of the techniques described herein. Similarly, application specific integrated circuits (ASICs) configured to perform some or all of the processes described herein may be included in the one or more processors on the system 100 or the associated navigation device 102.

Figure 3:
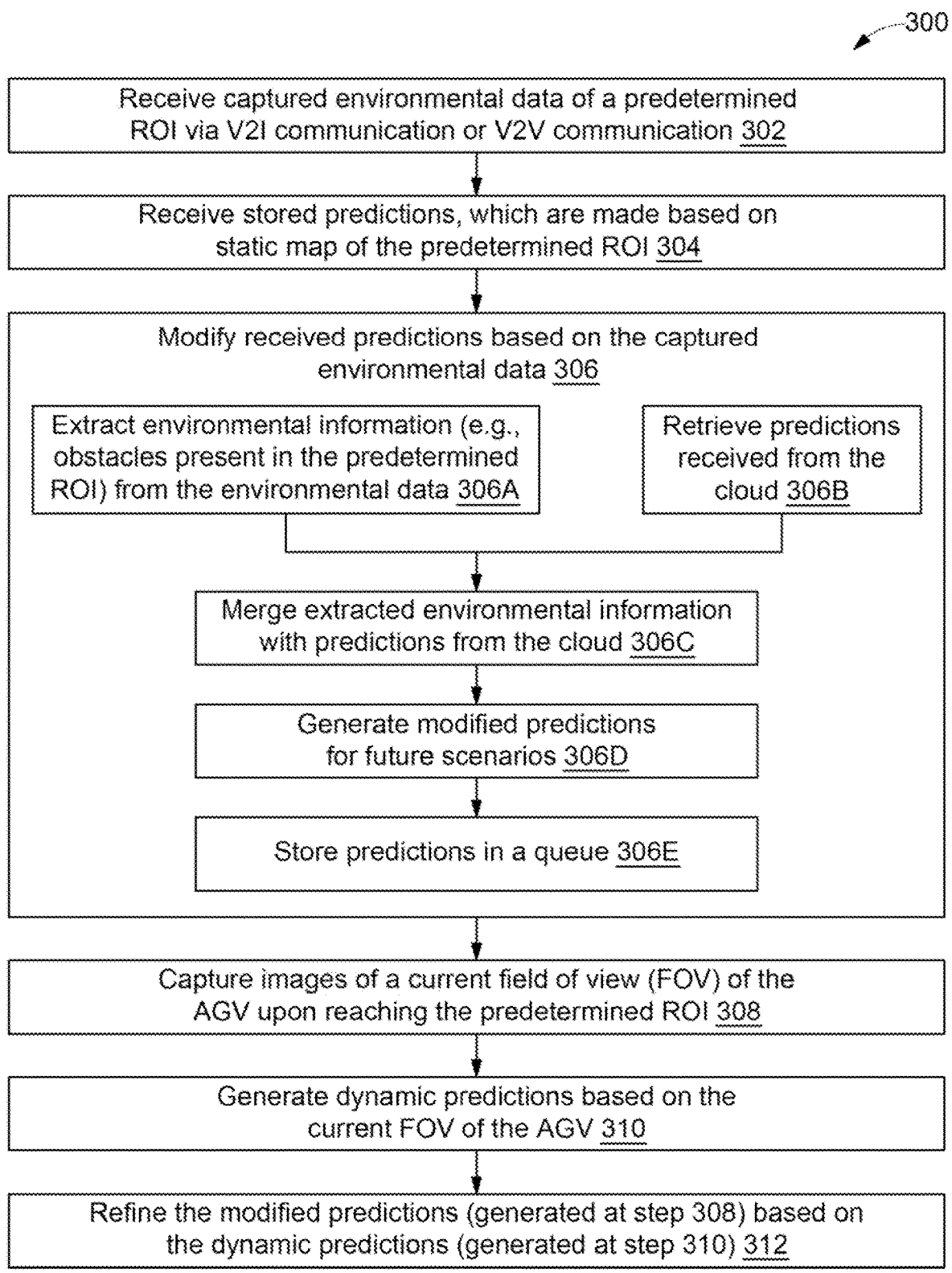
FIG. 3 is a flowchart of a process of determining a navigation trajectory for an AGV, in accordance with an embodiment.

Referring now to FIG. 3, a flowchart of a method 300 of determining a navigation trajectory for an AGV is illustrated, in accordance with an embodiment of the present disclosure. At step 302, a host vehicle (i.e. AGV) may use the V2I technology or V2V technology to communicate with the infrastructure or other vehicles, respectively. Through this communication, the AGV may receive environmental data, captured by sensors (e.g., vision sensors such as camera) mounted on the V2I infrastructure or V2V vehicle, with respect to a predetermined ROI. It may be noted that this predetermined ROI may be a region from which a camera sensor mounted/placed on the AGV may, in the future (say, after a time period when the AGV physically reaches the region), capture frames. In other words, the predetermined ROI may be an upcoming/future ROI. In some embodiments, the region (i.e., upcoming/future region) may be determined based on current location of the AGV, base path of the AGV, and predefined rules (say, region that is 30-40 meters ahead from the current location along the base path).

At step 304, the AGV may request for navigation trajectory predictions for the predetermined ROI from the cloud. The AGV may then receive the stored navigation trajectory predictions from the cloud. In some embodiments, a static map of the predetermined ROI may be fed to different neural network models to generate the navigation trajectory predictions. Thus, different neural network models may perform different tasks such as, but not limited to, semantic segmentation, object detection, lane detection, etc. The output from these models may be stored in a database. For example, the static map of the predetermined ROI may be fed to a first neural network model, which may perform semantic segmentation. Further, the static map of the predetermined ROI may be fed to a second neural network model, which may perform object detection. Furthermore, the static map of the predetermined ROI may be fed to a third neural network model, which may perform lane detection, and so on. The outputs from the first neural network model, the second neural network model, and the third neural network model may be stored in the database (for example, on the cloud). As will be appreciated, the AGV may receive these stored outputs with respect to the predetermined region from the database upon request.

At step 306, the received navigation trajectory predictions for the predetermined region may be modified based on the received environmental data of the predetermined ROI. In particular, at step 306A, environmental information (e.g., about obstacles present in the predetermined ROI) may be extracted from the received environmental data. Further, at step 306B, predictions received from the cloud may be retrieved. At step 306C, the environmental information (e.g., about the obstacles present in the predetermined ROI) and the predictions received from the cloud may be merged. At step 306D, modified predictions for the future scenarios (i.e., predetermined ROI or the upcoming ROI) may be generated based on the merging of the environmental information about the predetermined ROI and the received predictions about the predetermined ROI. For example, the predictions received from the cloud may be processed and modified according to the environment information, such as a type and a location of the obstacles present at the predetermined ROI, received through the V2I communication or V2V communication. It may be noted that, in some embodiments, the modified predictions may be generated without requiring any neural network. At step 306E, the modified predictions may be sent to the vehicle control module 216 and may be stored in a queue, which may be then used in future for processing.

At step 308, images of a current field of view (FOV) of the AGV may be captured upon reaching the predetermined ROI. Thus, images having varying backgrounds may be captured using a camera sensor or any image sensing/capturing device mounted on the AGV. For example, the camera may be placed in such a way that the FOV of the camera is broad to cover most of the surrounding scenes. For automotive applications, the camera sensor may be mounted atop the AGV, and may be perpendicular to the axis of the ground.

At step 310, dynamic predictions may be generated for the predetermined ROI based on the current FOV of the AGV. The images captured by the camera sensor may be fed to the on-board vehicle compute module 214 of the AGV, which may perform prediction using conventional or proprietary trajectory generation algorithms. In some embodiments, various different neural networks may be employed to perform different tasks such as, but not limited to, semantic segmentation, object detection, lane detection, etc., for the present scenario (i.e., current FOV, which is now about same as the predetermined ROI). The output computed by neural network models in the on-board vehicle compute module 214 may be sent to the dynamic refinement module 204 (of the navigation device 202) for further processing.

At step 312, the modified predictions (generated at step 306 for the predetermined ROI based on predictions made using the static map of the ROI and the environmental data captured using V2I/V2V technology) may be refined based on the dynamic predictions (generated at step 310 for the current FOV of the AGV). The output of the modified predictions for the future scenarios, which are stored in the queue, may be compared with the output of the predictions computed by the on-board vehicle compute module 214. It may be noted that this comparison may lead to an error. The error may be refined continuously, and the corrected predictions may be used to generate a final refined navigation trajectory. The final refined navigation trajectory may be sent to the vehicle control module 216 for further processing. The step 312 of refining the modified predictions for the predetermined ROI based on the dynamic predictions for the current FOV of the AGV is further explained in detail in conjunction with FIG. 4.

Figure 4:
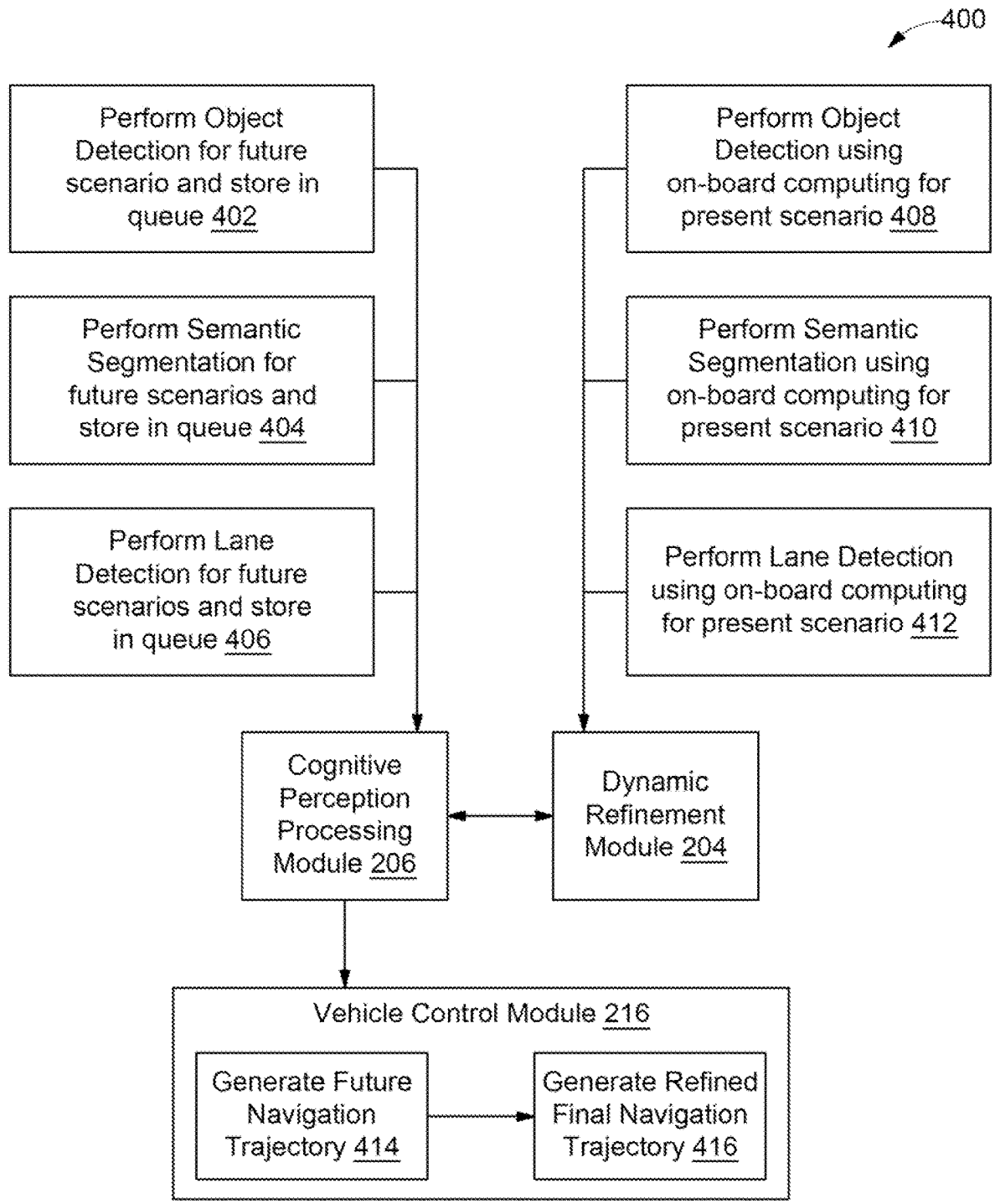
FIG. 4 is a flowchart of a process of refining modified predictions for a predetermined ROI, in accordance with an embodiment.

Referring now to FIG. 4, a flow chart of a method 400 of refining modified predictions for a predetermined ROI is illustrated, in accordance with an embodiment of the present disclosure. At step 402, object detection for future scenario may be performed, and stored in a queue. Simultaneously, at step 404, a semantic segmentation for future scenarios may be performed and store in the queue. Further, simultaneously, at step 406, lane detection may be performed for future scenarios and stored in the queue. It should be noted that the steps 402-406 may be performed by the cognitive perception processing module 206 of the navigation device 202 by modifying the predictions received from the cloud based prediction models (and generated based on a static map of the predetermined ROI) based on environmental information (extracted from the environmental data received from V2I infrastructure/V2V vehicle. Once the AGV physically reaches the predetermined ROI, the cognitive perception processing module 206 may retrieve modified predicted outputs (e.g., corresponding to steps 402-406) for the predetermined ROI that are stored in the queue and provide the same to the dynamic refinement module 204. Additionally, the cognitive perception processing module 206 may provide the modified predicted outputs to the vehicle control module 216.

At step 408, object detection may be performed using on-board computing for present scenario. Simultaneously, at step 410, semantic segmentation may be performed using on-board computing for the present scenario, and at step 412, lane detection may be performed using the on-board computing for the present scenario. It may be noted that the steps 408-412 may be performed by the on-board compute module 214. The on-board compute module 214 may then provide the dynamic predicted outputs for the current FOV to the dynamic refinement module 204 of the navigation device 202. The dynamic refinement module 204 may then compare the modified predicted outputs (received from the cognitive perception processing module 206) with the dynamic predicted outputs (received from the on-board compute module 214) to determine an error. The dynamic refinement module 204 may further refine the modified predicted outputs by reducing the comparison error, thereby generating the refined predicted outputs. The dynamic refinement module 204 may further provide the refined predicted outputs to the cognitive perception processing module 206, which may then provide the refined predicted outputs to the vehicle control module 216.

At step 414, the vehicle control module 216 may generate a future navigation trajectory based on the modified predicted outputs. At step 416, the vehicle control module 216 may refine the future navigation trajectory based on the refined predicted outputs to generate a final navigation trajectory. The final decisions for the autonomous navigation may be taken based on the final navigation trajectory (i.e., upon receiving the generated predictions for futuristic scenarios). This allows the vehicle control module 216 to navigate autonomously and perform tasks such as, not limited to, path planning, trajectory generation, steering angle computation etc.

Figure 5:
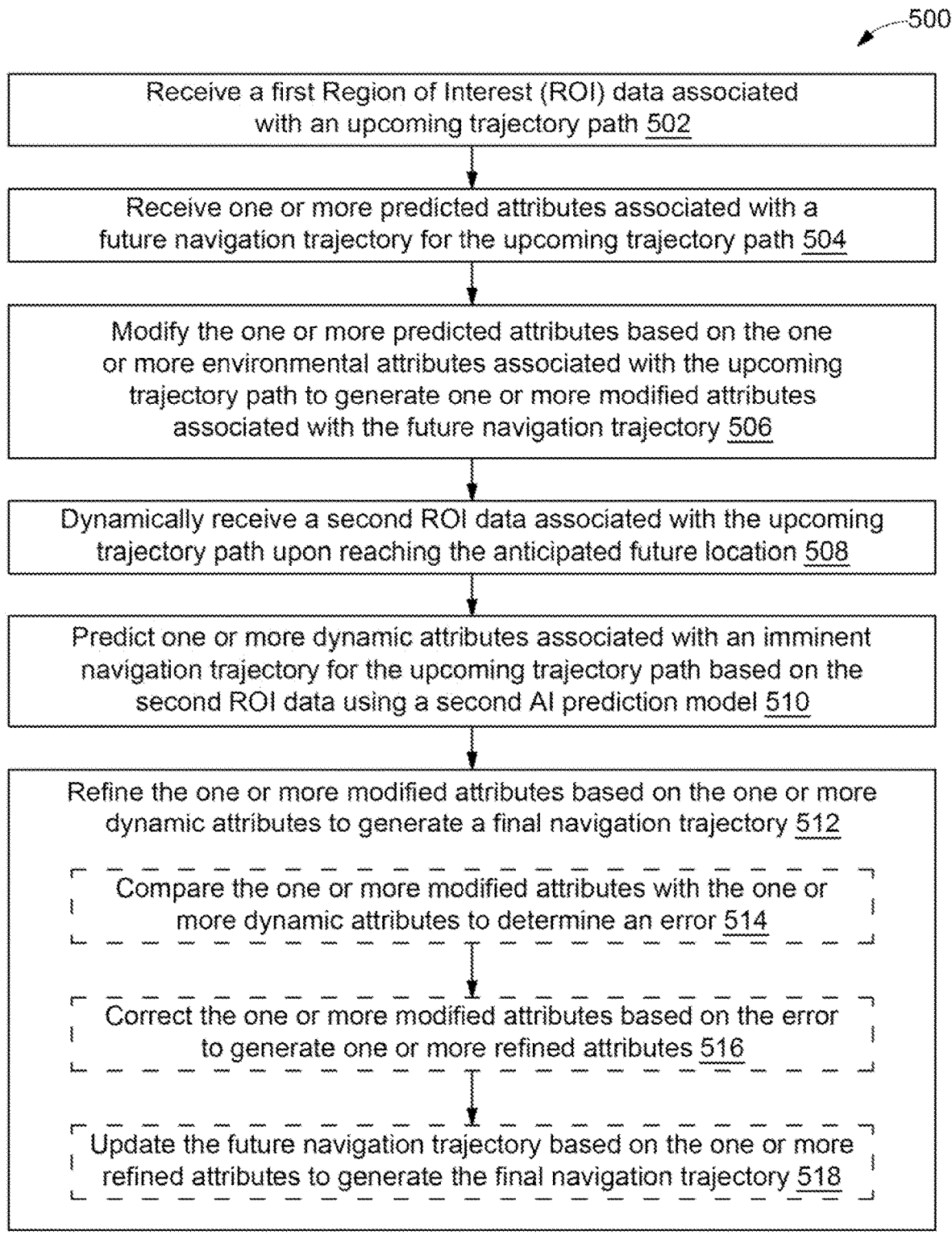
FIG. 5 is a flowchart of a detailed process of determining a navigation trajectory for an AGV, in accordance with an embodiment.

Referring now to FIG. 5, a flowchart of a detailed method 500 of determining a navigation trajectory for an AGV illustrated, in accordance with an embodiment of the present disclosure. At step 502, a first ROI data associated with an upcoming trajectory path may be received. The first ROI data may be captured while approaching the upcoming trajectory path from an anticipated future location of the AGV. Further, the first ROI data may be captured using one or more camera sensors installed on one or more roadside infrastructures or other AGVs. The first ROI data may be provided to the navigation device over V2I communication network or vehicle-to-vehicle (V2V) communication network. At step 504, one or more predicted attributes associated with a future navigation trajectory for the upcoming trajectory path may be received. The one or more predicted attributes may be predicted based on map data associated with the upcoming trajectory path using a first AI prediction model. Further, the one or more predicted attributes may be predicted based on at least one of a semantic segmentation, an object detection, and a lane detection. The first AI prediction model may be deployed on a cloud-based computing device.

At step 506, the one or more predicted attributes may be modified based on the one or more environmental attributes associated with the upcoming trajectory path, to generate one or more modified attributes associated with the future navigation trajectory. The one or more environmental attributes may be derived based on the first ROI data. Further, the one or more environmental attributes may include at least one of a type of an obstacle present in the upcoming trajectory path, and a location of the obstacle. At step 508, a second ROI data associated with the upcoming trajectory path may be dynamically received upon reaching the anticipated future location. At step 510, one or more dynamic attributes associated with an imminent navigation trajectory for the upcoming trajectory path may be predicted based on the second ROI data using a second AI prediction model. The second AI prediction model may be deployed on the navigation device. The one or more dynamic attributes may be predicted based on at least one of a semantic segmentation, an object detection, and a lane detection. At step 512, the one or more modified attributes may be refined based on the one or more dynamic attributes to generate a final navigation trajectory.

In some embodiments, at step 518, the one or more modified attributes may be refined using the first AI prediction model. Additionally, in some embodiments, the one or more modified attributes may be refined at step 518 as per steps 514-518. At step 514, the one or more modified attributes may be compared with the one or more dynamic attributes to determine an error. At step 516, the one or more modified attributes may be corrected based on the error to generate one or more refined attributes. At step 518, the future navigation trajectory may be updated based on the one or more refined attributes to generate the final navigation trajectory.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
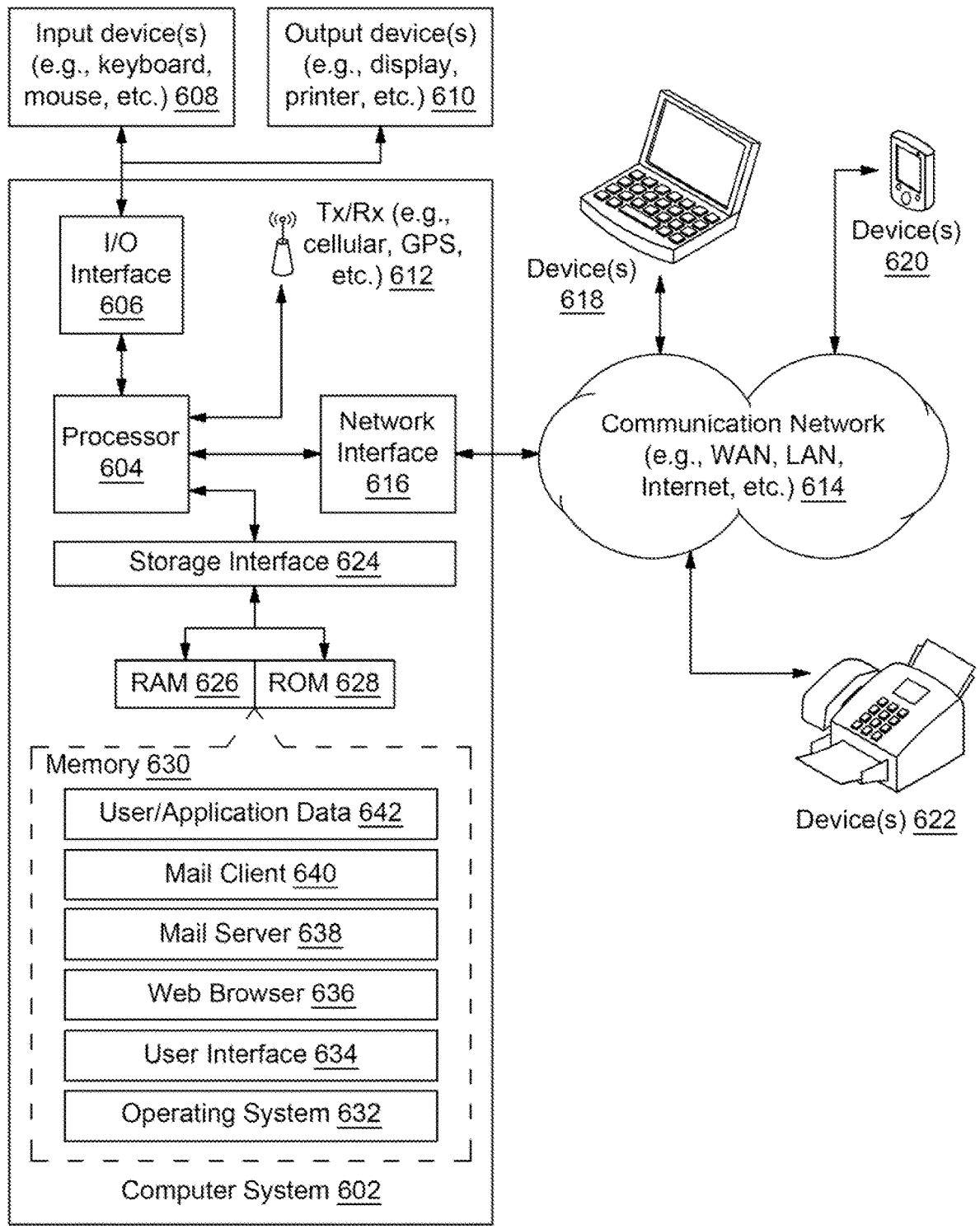
FIG. 6 is a block diagram of an exemplary computer system for implementing various embodiments.

The disclosed methods and systems may be implemented on a conventional or a general-purpose computer system, such as a personal computer (PC) or server computer. Referring now to FIG. 6, a block diagram of an exemplary computer system 602 for implementing various embodiments is illustrated. Computer system 602 may include a central processing unit ("CPU" or "processor") 604. Processor 604 may include at least one data processor for executing program components for executing user or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 610 may be a printer, fax machine, video display (for example, cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (for example, using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of these devices.

In some embodiments, processor 604 may be disposed in communication with one or more memory devices (for example, RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or data repository components, including, without limitation, an operating system 632, user interface application 634, web browser 636, mail server 638, mail client 640, user/application data 642 (for example, any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 602 may implement a mail server 638 stored program component. Mail server 638 may be an Internet mail server such as MICROSOFT® EXCHANGE® mail server, or the like.

Mail server 638 may utilize facilities such as ASP, ActiveX, ANSI C++/C #, MICROSOFT.NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such data repositories may be implemented as fault-tolerant, relational, scalable, secure data repositories such as ORACLE® data repository OR SYBASE® data repository. Alternatively, such data repositories may be implemented using standardized data structures, such as an array, hash, linked list, struct, structured text file (for example, XML), table, or as object-oriented data repositories (for example, using OBJECTSTORE® object data repository, POET® object data repository, ZOPE® object data repository, etc.). Such data repositories may be consolidated or distributed, sometimes among the various computer systems discussed above in this disclosure. It is to be understood that the structure and operation of the any computer or data repository component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

One or more techniques for determining a navigation trajectory for an AGV are disclosed. The techniques provide for modifying predictions generated based on a static map using obstacle information captured for an associated ROI, where the obstacle information is obtained from V2I infrastructure or V2V vehicle. Further, the static map predictions are refined using camera input based predictions for a current field of view of all future instances, thereby controlling the navigation trajectory on real-time basis. The techniques further include modifying the static map predictions based on the obstacle information received from the V2I infrastructure or V2V vehicle, and dynamically refining the modified predictions based on predictions generated over the camera input information for the current field of view for all future scenarios.

As such, the above techniques eliminate the need of various conventionally used sensors for obtaining depth information like LIDAR, etc. Further, the above techniques provide a cost-effective solution by relying on a camera sensor and V2I or V2V communication. The techniques allow for a distributed and autonomous control by AGVs that work in an environment where different kinds of vehicles (for example, autonomous, semi-autonomous, or human-operated vehicles) may be present. Moreover, in some embodiments, the techniques may further reduce communication complexity by relying only on V2I communication, thereby eliminating the need of V2V communication and reducing the communication traffic.

The specification has described method and system for determining a navigation trajectory for an AGV. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of determining a navigation trajectory for an autonomous ground vehicle (AGV), the method comprising:
   receiving, by a navigation device, first Region of Interest (ROI) data associated with an upcoming trajectory path,
     wherein the first ROI data is captured using a set of vision sensors installed on one or more road side infrastructures over vehicle-to-infrastructure (V2I) communication network, and
     wherein the first ROI data is an environmental data indicative of an obstacle present in a predetermined ROI along the upcoming trajectory path from an anticipated future location of the AGV;
   deriving, by the navigation device, one or more environmental attributes associated with the predetermined ROI based on the first ROI data;
   receiving, by the navigation device, one or more predicted attributes associated with a static map of the predetermined ROI, from a cloud,
     wherein the one or more predicted attributes are predicted by performing at least one of: a semantic segmentation, an object detection, and a lane detection on map data associated with the predetermined ROI, using a first artificial intelligence (AI) prediction model deployed on a cloud-based computing device;

modifying, by the navigation device, the one or more predicted attributes associated with the static map of the predetermined ROI, based on the one or more environmental attributes associated with the predetermined ROI, to generate one or more modified attributes associated with the static map of the predetermined ROI along the future navigation trajectory, wherein the one or more modified attributes are generated by:

extracting environmental information from the one or more environmental attributes, wherein the environmental information indicates obstacles present in the predetermined ROI;

receiving predictions from a cloud server;

merging the environmental information and the predictions received from the cloud server; and generating the one or more modified attributes based on the merging of the environmental information and the predictions received from the cloud server;

receiving, by the navigation device, a second ROI data associated with the predetermined ROI along the upcoming trajectory path upon reaching the anticipated future location, wherein the second ROI is captured by a current field-of-view (FOV) of the camera sensor mounted on the AGV;

predicting, by the navigation device, one or more dynamic attributes associated with the predetermined ROI along the upcoming trajectory path based on the second ROI data using a second AI prediction model deployed on the navigation device;

determining, by the navigation device, an error based on a comparison between the one or more modified attributes with the one or more dynamic attributes;

generating, by the navigating device, one or more refined attributes by correcting the one or more modified attributes based on the error;

updating, by the navigation device, the future navigation trajectory based on the one or more refined attributes to generate a final navigation trajectory to refine the one or more dynamic attributes, wherein the one or more modified attributes are refined based on the one or more dynamic attributes to generate the final navigation trajectory; and controlling, by the navigation device, the AGV to follow the final navigation trajectory.

2. The method of claim 1, wherein, the one or more dynamic attributes associated with the predetermined ROI are predicted, by the second AI prediction model by performing at least one of: the semantic segmentation, the object detection, and the lane detection.

3. The method of claim 1, wherein the first ROI data is further captured using a set of vision sensors installed on or other AGVs, and wherein the first ROI data is provided to the navigation device or vehicle-to-vehicle (V2V) communication network.

4. The method of claim 1, wherein the one or more environmental attributes comprise at least one of a type of an obstacle present in the upcoming trajectory path, and a location of the obstacle.

5. A navigation device for determining a navigation trajectory for an autonomous ground vehicle (AGV), the navigation device comprising:

a processor; and a memory communicatively coupled to the processor, wherein the memory stores processor instructions, which, on execution, causes the processor to:

receive first Region of Interest (ROI) data associated with an upcoming trajectory path, wherein the first ROI data is captured using a set of vision sensors installed on one or more road side infrastructures over vehicle-to-infrastructure (V2I) communication network, wherein the first ROI data is an environmental data indicative of an obstacle present in a predetermined ROI along the upcoming trajectory path from an anticipated future location of the AGV;

derive one or more environmental attributes associated with the predetermined ROI based on the first ROI date;

receive one or more predicted attributes associated with a static map Of the predetermined ROI, from a cloud;

wherein the one or more predicted attributes are predicted by performing at least one of: a semantic segmentation, an object detection, and a lane detection based—on map data associated with the predetermined ROI using a first artificial intelligence (AI) prediction model deployed on a cloud-based computing device;

modify the one or more predicted attributes associated with the static map of the predetermined ROI, based on the one or more environmental attributes associated with the predetermined ROI, to generate one or more modified attributes associated with the static map of the predetermined ROI along the future navigation trajectory, wherein the one or more modified attributes are generated by:

extracting environmental information from the one or more environmental attributes, wherein the environmental information indicates obstacles present in the predetermined ROI, receiving predictions from a cloud server, merging the environmental information and the predictions received from the cloud server, and generating the one or more modified attributes based on the merging of the environmental information and the predictions received from the cloud server, receive a second ROI data associated with the predetermined ROI along the upcoming trajectory path upon reaching the anticipated future location, wherein the second ROI is captured by a current field-of-view (FOV) of the camera sensor mounted on the AGV;

predict one or more dynamic attributes associated with the predetermined ROI along the upcoming trajectory path based on the second ROI data using a second AI prediction model deployed on the navigation device;

determine an error based on a comparison between the one or more modified attributes with the one or more dynamic attributes;

determine an error based on a comparison between the one or more modified attributes with the one or more dynamic attributes;

generate one or more refined attributes by correcting the one or more modified attributes based on the error;

update the future navigation trajectory based on the one or more refined attributes to generate a final navigation trajectory to refine the one or more dynamic attributes, wherein the one or more modified attributes are refined based on the one or more dynamic attributes to generate the final navigation trajectory; and control the AGV to follow the final navigation trajectory.

6. The navigation device of claim 5, wherein the one or more dynamic attributes associated with the predetermined ROI are predicted, based-on by the second AI prediction model by performing at least one of: the semantic segmentation, the object detection, and the lane detection.

7. The navigation device of claim 5, wherein the first ROI data is captured using a set of vision sensors installed on or other AGVs, and wherein the first ROI data is provided to the navigation device over vehicle-to-vehicle (V2V) communication network.

8. The navigation device of claim 5, wherein the one or more environmental attributes comprise at least one of a type of an obstacle present in the upcoming trajectory path, and a location of the obstacle.

9. A non-transitory computer-readable storage medium having stored thereon, a set of computer-executable instructions causing a computer comprising one or more processors to perform steps comprising:

receiving first Region of Interest (ROI) data associated with an upcoming trajectory path,
wherein the first ROI data is captured using a set of vision sensors installed on one or more road side infrastructures,
wherein the first ROI data is an environmental data indicative of an obstacle present in a predetermined ROI along the upcoming trajectory path from an anticipated future location of an autonomous ground vehicle (AGV);

deriving one or more environmental attributes associated with the predetermined ROI based on the first ROI data;

receiving one or more predicted attributes associated with a static map of the predetermined ROI, from a cloud,
wherein the one or more predicted attributes are predicted by performing at least one of: a semantic segmentation, an object detection, and a lane detection on map data associated with the predetermined ROI using a first artificial intelligence (AI) prediction model deployed on a cloud-based computing device;

modifying the one or more predicted attributes associated with the static map of the predetermined ROI, based on the one or more environmental attributes associated with the predetermined ROI to generate one or more modified attributes associated with the static map of the predetermined ROI along the future navigation trajectory, wherein the one or more modified attributes are generated by:

extracting environmental information from the one or more environmental attributes, wherein the environmental information indicates obstacles present in the predetermined ROI,
receiving predictions from a cloud server,
merging the environmental information and the predictions received from the cloud server, and
generating the one or more modified attributes based on the merging of the environmental information and the predictions received from the cloud server,
receiving a second ROI data associated with the predetermined ROI along the upcoming trajectory path upon reaching the anticipated future location,
wherein the second ROI is captured by a current field-of-view (FOV) of the camera sensor mounted on the AGV;

predicting one or more dynamic attributes associated with the predetermined ROI along the upcoming trajectory path based on the second ROI data using a second AI prediction model deployed on the navigation device;

determining an error based on a comparison between the one or more modified attributes with the one or more dynamic attributes;

generating one or more refined attributes by correcting the one or more modified attributes based on the error;

updating the future navigation trajectory based on the one or more refined attributes to generate a final navigation trajectory to refine the one or more dynamic attributes, wherein the one or more modified attributes are refined based on the one or more dynamic attributes to generate the final navigation trajectory; and controlling the AGV to follow the final navigation trajectory.

10. The non-transitory computer-readable storage medium of 9, wherein one or more dynamic attributes associated with the ROI are predicted by the second AI prediction model by performing based-on at least one of a semantic segmentation, an object detection, and a lane detection.

11. The non-transitory computer-readable storage medium of claim 9, wherein the first ROI data is captured using a set of vision sensors installed on other AGVs, and wherein the first ROI data is provided to the navigation device over vehicle-to-vehicle (V2V) communication network.

12. The non-transitory computer-readable storage medium of claim 9, wherein the one or more environmental attributes comprise at least one of a type of an obstacle present in the upcoming trajectory path, and a location of the obstacle.

* * * * *